Dec. 12, 1939.  F. W. HUMPHNER  2,183,315

DECALCOMANIA

Filed Feb. 11, 1937

Inventor:
Ferdinand W. Humphner,
By Dyrenforth, Lee, Chritton & Wiles,
Attys

Patented Dec. 12, 1939

2,183,315

UNITED STATES PATENT OFFICE 2,183,315

DECALCOMANIA

Ferdinand W. Humphner, Oak Park, Ill., assignor, by mesne assignments, to Mid-States Gummed Paper Company, a corporation of Delaware Application February 11, 1937, Serial No. 125,321

9 Claims. (Cl. 41—33)

This invention relates to a decalcomania. The invention is particularly useful in preventing the re-use of decalcomania stamps and other decalcomania products applied to liquor bottles and other packages.

While decalcomania transfers are relatively fragile in character, it has been possible and has been the practice in many cases for liquor stamps in the form of decalcomanias to be removed from bottles by soaking the bottles for a period of time, a considerable loss of revenue being suffered as a result of such practice. An object of this invention is to provide a decalcomania which will destroy or substantially impair the appearance of a decalcomania stamp or the like when the decalcomania is subjected to prolonged soaking, that is, to a period of soaking greater than that required for the normal release of the transfer. At the same time, my improved decalcomania permits the normal soaking necessary for the release of the transfer from the decalcomania base to be accomplished without affecting the same or its appearance.

My invention is useful in preventing the re-use of cigarette stamps and vehicle tax stamps and in fact may be employed wherever the re-use of any decalcomania is to be prevented.

The invention is illustrated, in preferred embodiments, by the accompanying drawing in which—

Figure 1:
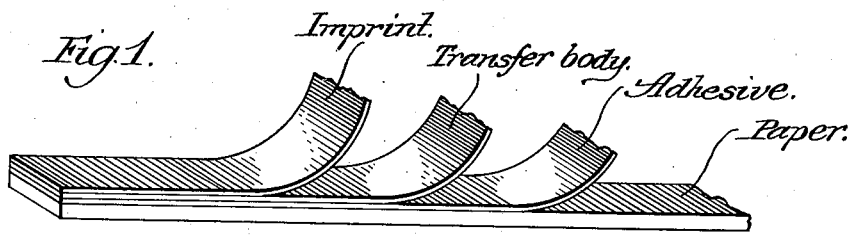
Figure 2:
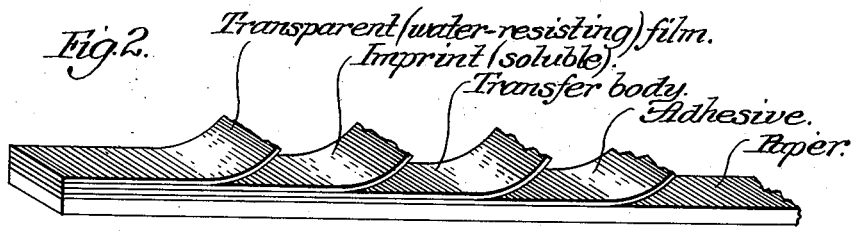
Figure 3:
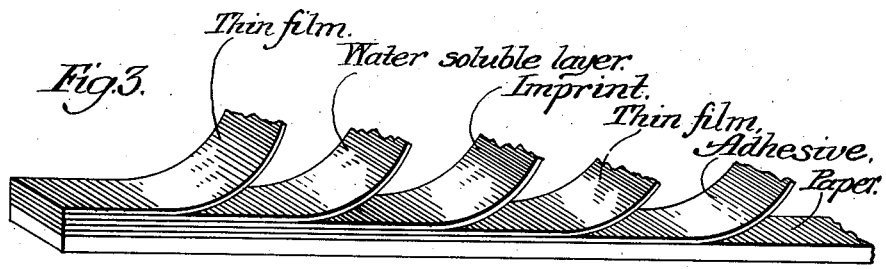
Figure 4:
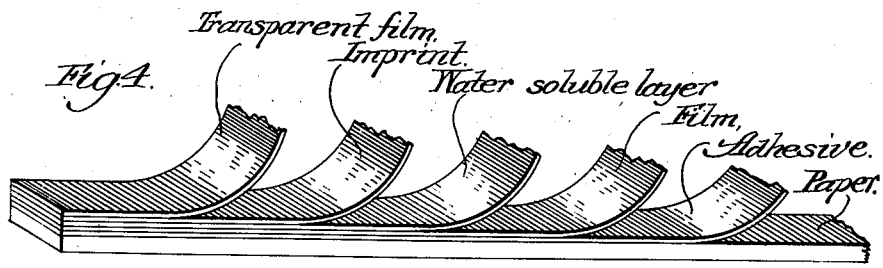

Fig. 1 is a broken perspective view of a decalcomania, the various layers thereof being curled at one end for the purpose of clearness; Fig. 2, a view similar to Fig. 1 showing a modification therein; Fig. 3, a view similar to Fig. 1 but showing another modification; and Fig. 4, another view similar to Fig. 1 but showing a modification.

The main idea of the invention is to provide an imprint which will be destroyed or impaired under the influence of prolonged soaking, but which will remain substantially unimpaired under the normal soaking which is required for the release of the transfer from its paper base. This I am able to accomplish by employing a special form of ink for forming the imprint, the imprint being resistant to normal soaking, but upon prolonged soaking becoming blurred and rendered indistinct. Ink for forming such an imprint may be produced in various ways and from various combinations. As an example, I find that a suitable ink may be prepared by mixing water and dry casein in equal parts, ammonia or borax being added in sufficient amount to bring the casein into complete solution. To the mixture, I add approximately 10% lithopone and then color the ink to the desired shade. The resulting mixture provides a suitable base for printing.

It will be understood that various substitutions can be made in the above formula. For example, titanium oxide may be substituted as a filler for lithopone, and if desired clay or fuller's earth may be substituted for lithopone. Also, resin or rosin may be used as a substitute for casein. If desired, a regular aniline ink may be employed, to which may be added any of the above materials to increase or regulate its resistance to water, starch, dextrin, gums, etc. being employed as a binder.

The term "transfer body" is used throughout the specification and claims to designate that layer of the decalcomania just above the adhesive and which holds and supports the ink imprint as it is being transferred from the paper base to the surface of an object in the use of the product.

In the illustration given in Fig. 1, a standard or regular form of decalcomania paper base is provided with an adhesive layer upon which is formed a transfer body, the transfer body being preferably formed of a material which is insoluble in water and not affected by water. Upon the transfer body is printed a semi-water soluble imprint made of the materials described above which have different rates of solubility or resistance to water. The imprint may be applied by a printing press, the above described ink being varied to the proper consistency for the press and surface upon which the imprint is to be formed. When the ink is dried, it takes on a similar appearance to printing ink and operates the same except that if prolonged application of water is made, it will destroy the printed surface, the subject matter, or the design.

In the ordinary operation of releasing the transfer from the paper base, the soaking in water seldom requires more than sixty seconds. Thus, the imprint has very little time to be affected by water or to cause any alteration. However, in the practice of soaking the stamp from the bottle, the period of soaking usually extends from one hour to twelve. The above described imprint, if allowed to soak for as much as ten minutes, becomes blurred and usually before the base film can be removed the printing has disappeared. It will be understood that the time factor, that is, the period of time required for the destruction or impairing of the imprint, can be varied considerably by varying the ingredients of the ink.

It will also be apparent that, as an equivalent to the above, the ink may be made more water-soluble and more rapidly responsive to soaking while the effect of the short or normal soaking can be obviated through the use of a protective film. In other words, a transparent water-resisting film can be placed over the soluble imprint and such a film will be effective for the ordinary soaking required for release, though not effective against any prolonged soaking. In Fig. 2, I have provided a paper base with the usual adhesive thereon, a substantially water-insoluble layer carried by the adhesive, and a rather readily soluble imprint carried by the substantially water-insoluble layer. Over such an imprint is placed a transparent film which resists the normal wetting required for releasing the transfer. In such case the water-insoluble layer and transparent film comprise the transfer body which is applied with the imprint to the surface of an object in the use of the decalcomania. Such a transparent film may be formed in various ways and of various ingredients. For example, such a transparent or translucent coating of water resisting material may be formed of resin, such as sandrac, copal, and the like, with a suitable solvent, such as alcohol, to cause the same to flow and form a film. The final dried product, when subjected to prolonged application of water, will tend to absorb water through the film and cause the imprint to become diffused or ruined.

It will also be understood that the imprint may be destroyed through prolonged soaking by forming a transfer body of a plurality of extremely thin films separated by soluble layer or layers, the imprint being carried by one of the films. Upon the dissolving of the separating soluble layers, the thin films will be separated and because of their fragile character will be unable to protect the imprint. In Fig. 3, I have shown the paper carrying the usual layer of adhesive. Upon the adhesive is a thin film of extremely fragile character. An imprint is formed thereon. A water soluble layer is carried by the imprint and a thin transparent film covers the top surface. The two films are sufficiently sturdy when united to provide a suitable transfer that can be removed from the paper base after the usual short soaking or wetting. However, upon prolonged soaking, the water soluble layer dissolves and separates the films which are no longer sturdy enough to permit handling. Thus, the imprint is impaired to the extent that it cannot be re-used. Any suitable water soluble material may be employed for separating the films. For example, dextrin, starch, gums, etc., may be used. If desired, a small amount of solvent may be added for slightly dissolving the base film so as to unite the adhesive therewith.

It will also be understood that a destructible imprint may be formed through the use of a water soluble adhesive or layer, the layer being protected by a film over the adhesive. I prefer to have the adhesive carrying the imprint protected on each side thereof by film. As shown more clearly in Fig. 4, I provide upon the usual paper and adhesive layers a pair of film layers and between them a water soluble layer carrying an imprint. The two film layers protect the water soluble layer and its imprint during the normal soaking or wetting operation necessary for the release of the transfer. However, upon prolonged soaking, water penetrates to the water soluble layer and upon its dissolving, the imprint becomes blurred and tends to disappear.

The illustrations set out herein are merely examples of a large number of methods and means for destroying or impairing the imprint. It will be obvious that a variety of arrangements may be made for accomplishing this purpose. The character of the ink forming the imprint, the character of the layer carrying the imprint, the character of superposed or protecting layers above or around the imprint may be modified and varied in many ways to render the imprint blurred or indistinct upon prolonged contact with water. If desired, portions only of the imprint may be so affected, the remaining portions being left intact, thus making a counterfeit all the more obvious.

It is believed unnecessary to set out or attempt to set out all the permutations in which the invention may be employed, it being apparent that to anyone skilled in the art that such changes and modifications may be made readily once the invention is understood and without departing from the spirit of the invention.

The foregoing detailed description has been given for clearness of understanding only, and no unnecessary limitations should be understood therefrom, but the appended claims should be construed as broadly as permissible, in view of the prior art.

I claim:

1. A decalcomania comprising: a paper base, water soluble adhesive thereon, a transfer body carried by said adhesive, and a partially water soluble imprint carried by said body, said imprint being unaffected by the normal contact with water necessary for releasing the transfer but being substantially impaired by prolonged contact with water beyond said period.

2. A decalcomania comprising: a paper base, water soluble adhesive thereon, a transfer body carried by said adhesive, and an imprint carried by said body, said imprint comprising a mixture of water soluble and water insoluble ingredients and being substantially destroyed by contact with water prolonged substantially beyond the period required for release of said transfer from said base.

3. A decalcomania comprising: a paper base, water soluble adhesive thereon, a transfer body carried by said adhesive, and an imprint carried by said body, said imprint being formed of ink including at least one water soluble ingredient, said ink being resistant to water during the period required for the release of said transfer from said base but soluble in water when said contact is prolonged substantially beyond said period for release.

4. A decalcomania comprising: a paper base, water soluble adhesive thereon, a transfer body carried by said adhesive, and an imprint carried by said body, said imprint being formed of ink containing a small proportion of at least one water soluble ingredient, the remaining ingredients being insoluble in water.

5. A decalcomania comprising: a paper base, water soluble adhesive thereon, a transfer body carried by said adhesive, and an imprint upon said body, said imprint being formed of a casein base ink and being resistant to water during the period of contact with water required for separating the transfer from the base but being destroyed by water after contact with water prolonged substantially beyond said period.

6. A decalcomania comprising: a paper base, water soluble adhesive thereon, a transfer body carried by said adhesive, and an imprint carried by said body formed of an ink comprising casein, water, ammonia, borax, and a pigment.

7. A decalcomania comprising: a paper base, water soluble adhesive thereon, a transfer body carried by said adhesive, a substantially water soluble imprint carried by said body, and a water resisting film extending over said imprint and protecting said imprint during the period of time required for the release of said transfer but permitting water to reach and dissolve said imprint when said contact with water is prolonged substantially beyond said period required for release.

8. A decalcomania comprising: a paper base, water soluble adhesive thereon, a transfer body carried by said adhesive, a substantially water soluble imprint carried by said body, and a transparent water resisting film extending over said imprint and protecting said imprint during the period of time required for the release of said transfer but permitting water to reach and dissolve said imprint when said contact with water is prolonged substantially beyond said period required for release.

9. In a decalcomania of the character set forth, a paper base, adhesive carried thereby, a film carried by said adhesive, an imprint upon said film, a transparent film above said imprint, said imprint being formed of soluble material and said films being sufficiently water resisting to prevent water from reaching said imprint during the brief period of soaking required for releasing the transfer but permitting water to reach said imprint when said soaking period is prolonged substantially beyond said period required for release.

FERDINAND W. HUMPHNER.